(12) United States Patent
Tew et al.

(10) Patent No.: US 12,517,654 B2
(45) Date of Patent: Jan. 6, 2026

(54) INTELLIGENT DATA DUPLICATION/BACKUP BASED ON ARTIFICIAL INTELLIGENCE FOR DATA STORAGE DEVICES

(71) Applicant: Sandisk Technologies, Inc., Milpitas, CA (US)

(72) Inventors: Wei Hong Tew, Penang (MY); Tze Ping Chan, Penang (MY); Chun Sean Lau, Penang (MY)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/748,013

(22) Filed: Jun. 19, 2024

(65) Prior Publication Data

US 2025/0390217 A1 Dec. 25, 2025

(51) Int. Cl.
*G06F 21/00* (2013.01)
*G06F 3/06* (2006.01)
*G06V 20/40* (2022.01)
*G10L 15/08* (2006.01)

(52) U.S. Cl.
CPC ............ *G06F 3/0607* (2013.01); *G06F 3/065* (2013.01); *G06F 3/0673* (2013.01); *G06V 20/40* (2022.01); *G10L 15/08* (2013.01)

(58) Field of Classification Search
CPC ............... G06F 3/0484; G06F 2200/00; G06F 2201/00; G06F 2203/00; G06F 2205/00; G06F 2206/00; G06F 1/00; G06F 3/00; G06F 5/00; G06F 7/00; G06F 8/00
See application file for complete search history.

(56) References Cited

U.S. PATENT DOCUMENTS 9,961,403 B2    5/2018  Kritt et al.
12,277,233 B1 * 4/2025  Agrawal ............... G06F 21/577

FOREIGN PATENT DOCUMENTS

CN        112468877        3/2021

* cited by examiner

*Primary Examiner* — Yong J Choe
(74) *Attorney, Agent, or Firm* — Patterson + Sheridan, LLP

(57) ABSTRACT

A data storage device can include control circuitry configured to: analyze one or more files of a host and one or more files of the data storage device based on content of the one or more files of the host and the one or more files of the data storage device without considering respective file names and folder locations to determine whether files are duplicated between the host and the data storage device; determine a file to back up from the host to the data storage device; analyze an initial portion of content of the file based on machine learning or artificial intelligence; and provide a suggested file name for the file for backup to the data storage device based on the analysis of the initial portion of the content of the file, a file naming convention of the host, or a file naming convention of the data storage device.

20 Claims, 10 Drawing Sheets

INTELLIGENT DATA DUPLICATION/BACKUP BASED ON ARTIFICIAL INTELLIGENCE FOR DATA STORAGE DEVICES

BACKGROUND

Field

This disclosure relates to data duplication or backup between hosts and/or data storage devices. More particularly, the disclosure relates to devices and methods for facilitating duplication/backup of data between hosts and data storage devices, for example, based on artificial intelligence.

Description of Related Art

In many cases, a user may want to copy or duplicate data between different devices, such as hosts and/or data storage devices. However, same files may be named differently on different devices, and it may be difficult for the user to determine which files need to be copied to a data storage device.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

In some cases, a user may want to duplicate or synchronize files between two different devices, such as a host and an external data storage device. For instance, a user may want to copy files from a host (e.g., a computer) to an external data storage device that are not already stored on the external data storage device. The host and the data storage device may both be associated with the user, or the host may be associated with another user. However, same or similar files on the host and the data storage device may have different file names, and it may be difficult for the user to determine which files need to be copied to the data storage device. For example, the user may have to open files and check manually whether the user needs certain files. This can be a time consuming and tedious process.

A data storage device according to certain aspects can provide intelligent data duplication based on artificial intelligence. The data storage device can compare files on a host and the data storage device based on content of the files without considering file names and identify files for data duplication. By analyzing the content of the file, the data storage device can identify files that have similar or same content but have different file names on the host and the data storage device as well as files that have the same name on the host and the data storage device but have different content. For instance, content of the files can be analyzed based on image recognition, speech/voice recognition, etc. Files can be duplicated to the host, the data storage device, or both the host and the data storage device. After comparing files on the host and the data storage device, for files that need to be duplicated, the data storage device can provide suggested file names based on analysis of the content of the files. For instance, the data storage device can analyze an initial portion of a file to provide a suggested file name. The initial portion of the file can be analyzed based on image recognition, speech/voice recognition, etc. The data storage device can understand file/folder structure and naming convention in the host and the device, which can be used in providing suggested file names. Details relating to intelligent data duplication are further explained below in connection with FIGS. 1-7.

Figure 1:
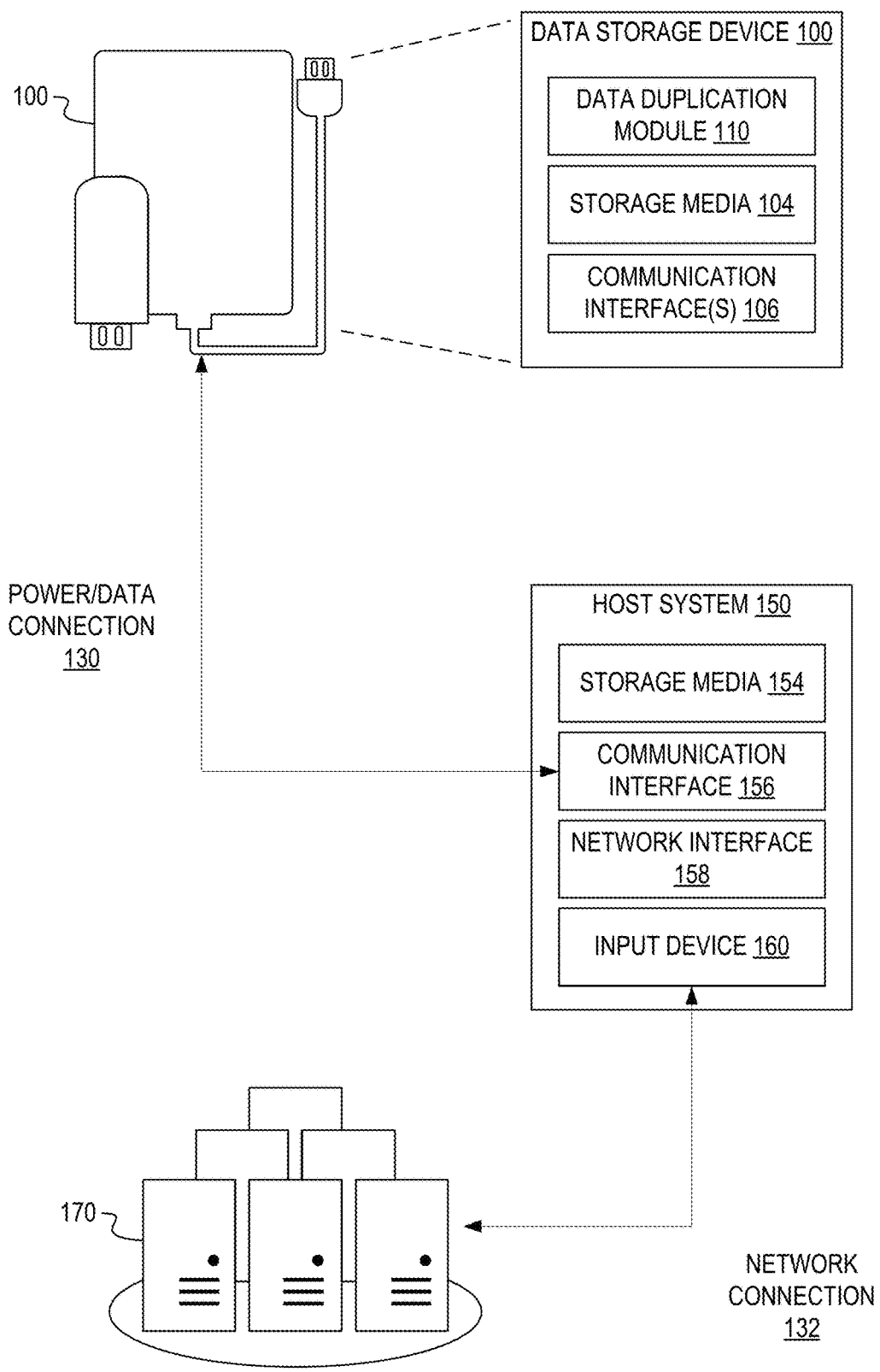
FIG. 1 illustrates a block diagram of a data storage device and a host system configured to provide intelligent data duplication, according to certain embodiments.

Intelligent Data Duplication Based on Artificial Intelligence for Data Storage Devices FIG. 1 illustrates a block diagram of a data storage device 100 and a host system 150 configured to provide intelligent data duplication or backup, according to certain embodiments. The data storage device 100 can include a data duplication manager 110, storage media 104, and a communication interface 106. The data storage device 100 can be external to the host system 150. Various types of external data storage devices 100 can be used. The data storage device 100 can receive power from the host system 150 and then receive files from or send files to the host system 150 over a power/data connection 130. The power/data connection 130 can provide a power and/or data connection between the data storage device 100 and a communication interface 156 of the host system 150.

The data duplication manager 110 can be configured to perform intelligent data duplication. When the data storage device 100 is connected to the host system 150, the data duplication manager 110 can compare files on the host system 150 and the data storage device 100 using artificial intelligence (AI) to identify which files need to be duplicated. The data duplication manager 110 can analyze content of the files without considering file names based on image recognition, speech recognition, etc. For files that need to be duplicated, the data duplication manager 110 can provide suggested file names based on analysis of the content of the files. For example, suggested file names can be based on analysis of initial portions of files. The data duplication manager 110 can further understand naming convention/folder structure of the host system 150 and the data storage device 100 and may use the naming convention/folder structure in providing suggested file names. The data duplication manager 110 can include an artificial intelligence/machine learning (ML) component.

In some embodiments, the data duplication manager 110 can analyze files in a category of files selected by a user. Analyzing all files on the host system 150 and the data storage device 100 may be time consuming, and the user can be prompted to select a category of files of interest, which may be based on file types or file extensions. In certain embodiments, after the data duplication manager 110 analyzes the files on the host system 150 and the data storage device 100, the data duplication manager 110 may check a verified source to determine whether a file matches a file in the verified source. If the file matches the verified source, the data duplication manager 110 may use the file name of the matching file in the verified source as the suggested file name of the file. In some embodiments, the data duplication manager 110 can group the files having similar file names into the same folder to organize the files. For instance, files having file names that have a similarity above a threshold value can be grouped into a folder. The file names may be suggested based on the analysis of the files based on AI or may be from a verified source.

According to certain aspects, the AI suggested file names and/or verified source file names may be used as temporary file names for identifying and organizing similar or related files. Temporary file names can be used prior to the user selecting which file name/folder structure to follow for data duplication. For example, the user can be prompted to select to use AI suggested file name/folder structure, a host system file name/folder structure, or a data storage device file name/folder structure for data duplication. The temporary file names may be used as actual file names for data duplication if the user selects to use AI suggested file name/folder structure. If the user selects to use the host system file name/folder structure or the data storage device file name/folder structure, the data duplication manager 110 can use host file names or the data storage device file names as actual file names for data duplication, respectively. In some embodiments, similar to file names, the data duplication manager 110 can provide suggested folder names for folders created to organize the grouped files. These folders may also be used as temporary folders for identifying and organizing similar or related files. The temporary folder names may be used as actual file names for data duplication if the user selects to use AI suggested file name option. If the user selects to use the host system file name/folder structure or the data storage device file name/folder structure, the data duplication manager 110 can use host folder names or the data storage device folder names as actual folder names for data duplication, respectively. Details relating to the data duplication manager 110 are described further in connection with FIGS. 2-7 below.

The data storage device 100 can employ a variety of storage technologies and/or form factors. For example, the data storage device 100 may be a solid-state drive (SSD), Secure Digital (SD) card, or a universal serial bus (USB) memory stick that uses semiconductor memory as the storage media 104. In other implementations, the data storage device 100 may be a hard disk drive (HDD) that uses magnetic disks as the storage media 104 or a solid-state hybrid drive (SSHD) that uses a combination of semiconductor memory and magnetic disk technology.

The host system 150 can include storage media 154, a communication interface 156, a network interface 158, and an input device 160. The storage media 154 can store data files and can include a solid-state drive (SSD), solid-state hybrid drive (SSHD), hard disk drive (HDD), or the like. The communication interface 156 can provide a power and/or a data connection 130 to the data storage device 100. For example, the communication interface can be a Universal Serial Bus (USB) port and associated controller. The network interface 158, such as Wi-Fi or ethernet, can enable the host system 150 to receive data from network servers 170 from the Internet or other network over a network connection 132. The input device 160 can receive commands from a user. The host system 150 may be a computer, laptop, mobile device, or the like.

Intelligent data duplication can be provided in various contexts, between various types of devices, etc. In some embodiments, data duplication can be provided between a host system 150 and a data storage device 100 as described above. In other embodiments, data duplication can be provided between a host system 150 and one or more network servers 170 (e.g., web servers, cloud service, etc.). The data duplication manager 110 may be included within the data storage device 100, the host system 150, or the network servers 170, depending on the embodiment.

Figure 2:
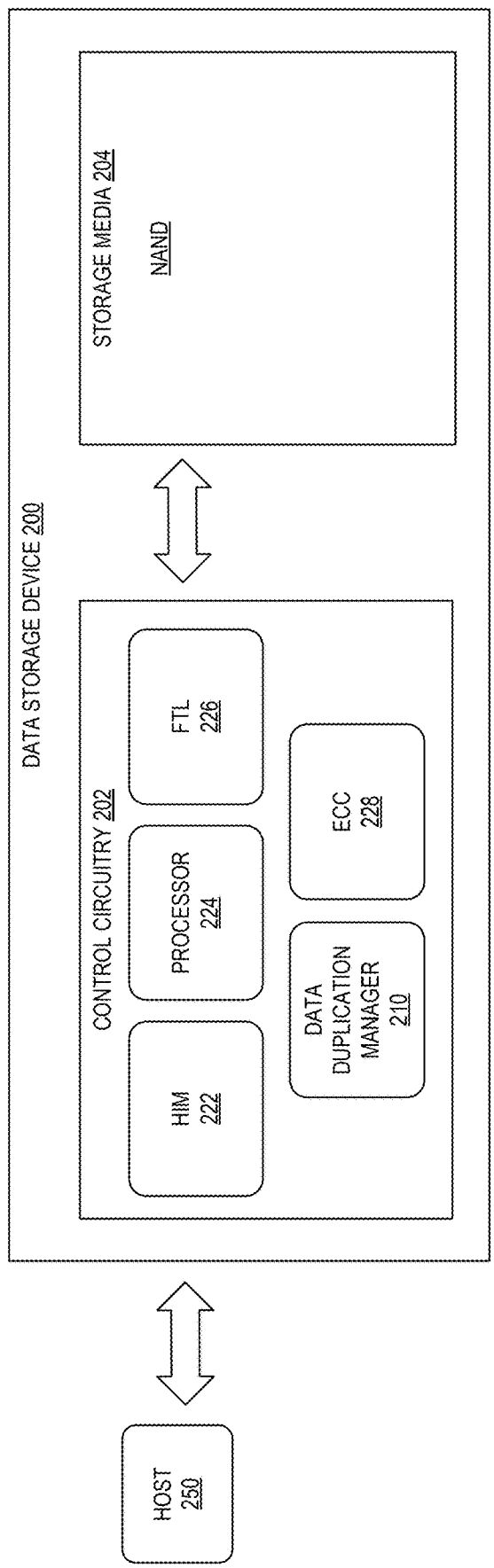
FIG. 2 illustrates a block diagram of an example data storage device configured to provide intelligent data duplication, according to certain embodiments.

FIG. 2 illustrates a block diagram of an example data storage device 200 configured to provide intelligent data duplication, according to one or more embodiments. In some embodiments, components of FIG. 2 can be similar to components of FIG. 1 having similar names and/or reference numbers. For example, the data storage device 200 can be similar to a data storage device 100 in FIG. 1. Certain details relating to FIG. 2 are described above in connection with FIG. 1.

A data storage device 200 can communicate with a host 250. The data storage device 200 can include control circuitry 202 and storage media 204. As shown in FIG. 2, the data storage device 200 is an SSD device and includes NAND arrays/memory. For example, the control circuitry 202 can include a controller. The control circuitry 202 may include various components. The control circuitry 202 can include hardware and/or software (e.g., firmware) for performing intelligent data duplication, such as a data duplication manager 210. The control circuitry 202 can also include additional functionality. For example, the control circuitry 202 may support file-based storage. The control circuitry 202 can also include functionality for managing data transfers of the data storage device 200.

In some embodiments, the control circuitry 202 includes a host interface manager (HIM) 222, a processor 224, a flash translation layer (FTL) 226, an error correction code (ECC) engine 228, and a data duplication manager 210. The HIM 222 can manage interfacing and communication between the host 250 and the data storage device 200. Examples of the interface between the host 250 and the data storage device 200 may include peripheral component interconnect express (PCIe), serial advanced technology attachment (SATA), non-volatile memory express (NVMe), etc. The HIM 222 can receive various data requests, such as read requests or write requests. The processor 224 can be configured to execute instructions related to processing data requests. The FTL 226 may handle translation of logical block addresses (LBAs) from the host 250 to physical addresses on the storage media 204 as well as garbage collection. The error correction code (ECC) engine can perform error correction for data, such as generating parity data. The data duplication manager 210 can provide functionalities related to intelligent data duplication. The data duplication manager 210 may be implemented in firmware, which may be run on a controller chip. In some implementations, the data duplication manager 210 may be a specialized, hardware-based chip for performing intelligent data duplication. The data duplication manager 210 may be implemented as one or more components or one or more modules. The data duplication manager 210 can be the same as or similar to a data duplication manager 110 in FIG. 1. The data storage device 200 and/or the control circuitry 202 may include additional or fewer components, depending on the embodiment.

Figure 3:
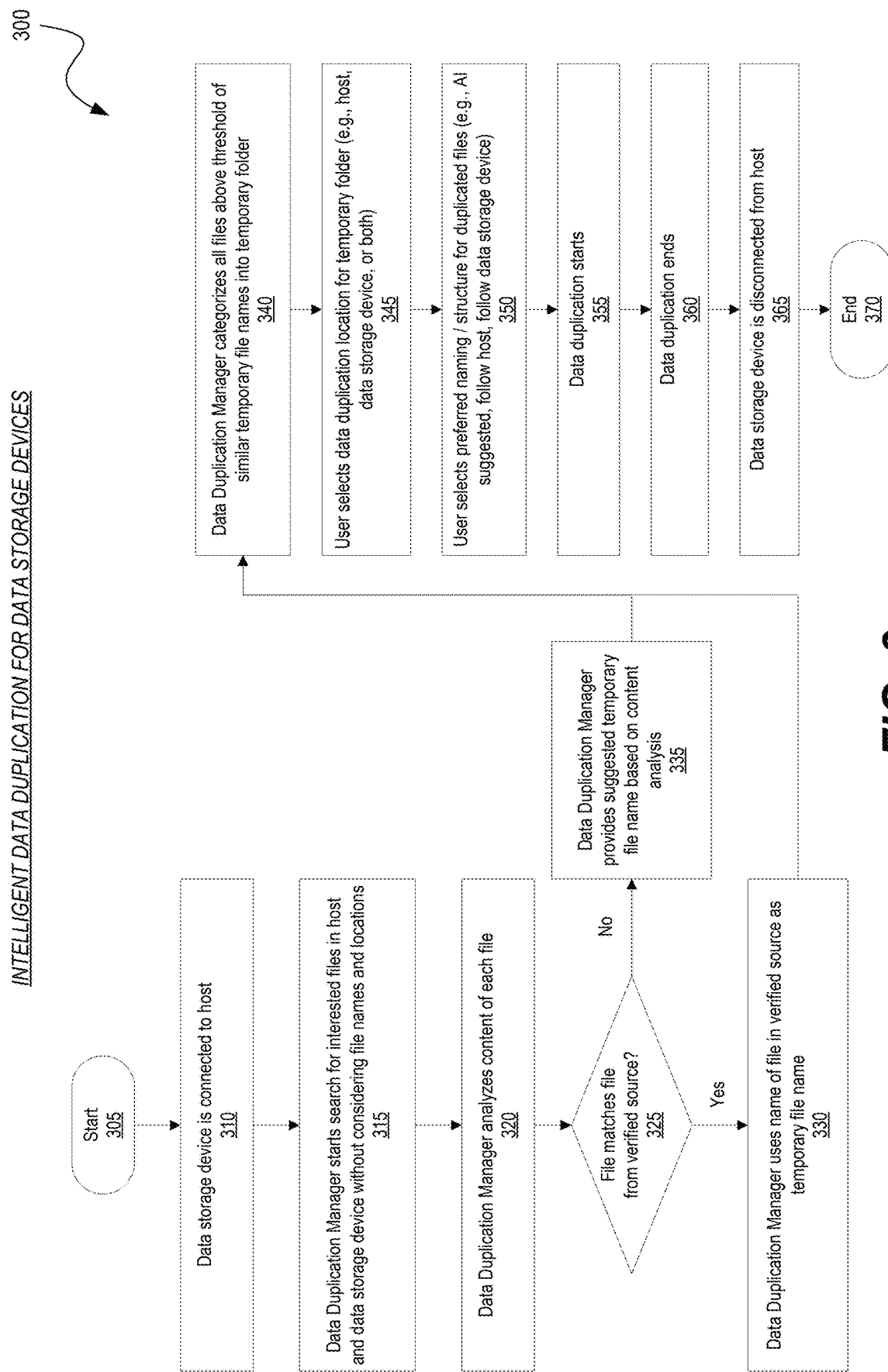
FIG. 3 illustrates a workflow process for providing intelligent data duplication in a data storage device, according to certain embodiments.

FIG. 3 illustrates a workflow process 300 for providing intelligent data duplication in a data storage device, according to one or more embodiments. The workflow process 300 may be implemented by a data storage device, such as a data storage device 100, 200 in FIGS. 1-2. For example, the workflow process 300 may be performed in part or in whole by a data storage device or one of its components, such as control circuitry, a processor, or a data duplication manager 110, 210. For illustrative purposes, the process 300 is explained below in connection with the data storage device 200 in FIG. 2. Certain details relating to the process 300 are explained in more detail with respect to FIGS. 1-2. Depending on the embodiment, the process 300 may include fewer or additional blocks, and the blocks may be performed in an order that is different from illustrated.

The process 300 starts at block 305. At block 310, a data storage device 200 is connected to a host. The data storage device 200 can be associated with a user. The user associated with the data storage device 200 may be the same or different from the user associated with the host. At block 315, the data duplication manager 210 starts search for interested files in the host and the data storage device 200 without considering file names and locations. The data duplication manager 210 can ask whether the user would like to perform intelligent data duplication and receive permission to analyze files. Since the data storage device 200 can include a large number of files, the data duplication manager 210 can prompt the user to select a category of files that the user would like to duplicate. For instance, the data duplication manager 210 can be based on file types or extensions. Examples of file types can include application files, video files, audio files, picture files, document files, portable document format (PDF) files, etc. Examples of file extensions can include exe, mp4, mp3, jpeg, doc, docx, pdf, etc. After the user selects a category of files of interest, the data duplication manager 210 can initiate the data duplication process and analyze files in the selected category on the host and the data storage device 200. For instance, the data duplication process and analysis of the files can be performed in the background. In some cases, the user may select one or more categories of interest. In certain embodiments, the data duplication manager 210 may not prompt the user to select a category of files of interest, but analyze all files on the host and the data storage device 200 to perform data duplication.

At block 320, the data duplication manager 210 analyzes content of each file. For example, the data duplication manager 210 can analyze files based on AI or other suitable techniques without considering file names to compare the content of the files. In many cases, identical or similar files may be named differently on different devices, and it may be difficult for the user to determine whether certain files need to be duplicated without manually opening the files. As an example, the data duplication manager 210 can perform image recognition to analyze a video file or an image file. As another example, the data duplication manager 210 can perform speech recognition to analyze an audio file. For instance, the data duplication manager 210 can analyze files using machine learning models, including neural networks such as a deep neural network (DNN), a convolutional neural network (CNN), etc. By analyzing and comparing the files on the host and the data storage device 200, the data duplication manager 210 can identify whether certain files reside only on the host, only on the data storage device 200, or both. Identified files can be duplicated from the host to the data storage device 200, from the data storage device 200 to the host, or to both the host and the data storage device 200. For instance, the user can select whether to duplicate files from the host to the data storage device 200, from the data storage device 200 to the host, or to both the host and the data storage device 200, for example, at block 345. All or a subset of identified files may be duplicated depending on which option is selected.

At block 325, the process 300 determines whether a file matches a file from a verified source. After files for duplication are identified, the process 300 can check a verified source to determine whether a file matches a file from the verified source. For instance, a verified source can be a library of files, for example, accessible via a network connection. If the file matches a file from a verified source at block 325, the process 300 proceeds to block 330. At block 330, the data duplication manager 210 uses the name of the file in the verified source as a temporary file name, and the process 300 proceeds to block 340. Temporary file names may be provided for identified files for data duplication prior to the user selecting whether to use suggested file names, follow host file names, or follow data storage device file names, for example, at block 350. In some embodiments, block 325 and block 330 can be optional.

If the file does not match a file from a verified source at block 325, the process 300 proceeds to block 335. At block 335, the data duplication manager 210 provides a suggested temporary file name based on content analysis, and the process 300 proceeds to block 340. The data duplication manager 210 can analyze content of a file to determine a topic or a context and suggest a file name based on the analysis. For instance, an initial portion of the file can be analyzed, for example, as described in connection with FIG. 5 below. A file may be analyzed based on AI techniques, such as image recognition, speech recognition, etc. In some embodiments, suggested file names may be provided after the user selects data duplication location at block 345 and/or after the user selects preferred naming/structure for duplicated files at block 350. In certain embodiments, analysis of a file to provide a suggested file name can be done when analyzing the content of the file at block 320.

At block 340, the data duplication manager 210 categorizes all files above a threshold of similar temporary file names into a temporary folder. The data duplication manager 210 can facilitate organizing files into groups or categories based on similar temporary file names. Accordingly, there may be multiple temporary folders each including files with similar file names. The user may select one or more temporary folders for data duplication. In some embodiments, block 340 can be optional.

At block 345, the user selects data duplication location for the temporary folder (e.g., host, data storage device, or both). As mentioned above, the user may select whether to duplicate files from the host to the data storage device 200, duplicate from the data storage device 200 to the host, or duplicate files to both the host and the data storage device 200. For example, data duplication can be one way or both ways. If the user selects to duplicate files from the host to the data storage device 200, the data duplication manager 210 can copy files that are only stored on the host to the data storage device 200. If the user selects to duplicate files from the data storage device 200 to the host, the data duplication manager 210 can copy files that are only stored on the data storage device 200 to the host. If the user selects to duplicate files to both the host and the data storage device 200, the data duplication manager 210 can copy files that are only stored on the host to the data storage device 200 and copy files that are only stored on the data storage device 200 to the host. Files that are already stored on both the host and the data storage device 200 do not need to be copied to the other device, but may be renamed and/or grouped into folders for better organization. For example, already existing files on both the host and the data storage device 200 may be renamed and grouped into folders with other related files that are duplicated from the host and/or the data storage device 200. In some embodiments, if a file on one device (e.g., the host or the data storage device 200) is an updated version of the file on the other device, the file can be updated to the updated version on the other device.

At block 350, the user selects preferred naming/structure for duplicated files (e.g., AI suggested, follow host, follow data storage device). If the user selects AI suggested file name/folder structure, the data duplication manager 210 duplicates files using the AI suggested file name/folder structure. If the user selects following host file name/folder structure, the data duplication manager 210 duplicates files using the host file name/folder structure. If the user selects following the data storage device name/structure, the data duplication manager 210 duplicates files using the data storage device file name/folder structure. The data duplication manager 210 can understand naming/folder structure of the host and the data storage device 200 and can use the naming/folder structure in providing suggested file names. In some embodiments, if file names are available from a verified source, for example, at block 330, the file names from the verified source may be used when the user selects AI suggested file name/folder structure.

At block 355, data duplication starts. For example, files can be duplicated based on user selection of duplication to host, to the data storage device 200, or to both, and based on user selection of suggested name/folder structure, host file name/folder structure, or data storage device 200 file name/folder structure. At block 360, data duplication ends. At block 365, the data storage device 200 is disconnected from the host. The process 300 ends at block 370.

As described above, the data duplication manager 210 can automatically analyze content of files without considering file names based on AI to determine which files need to be duplicated between the host and the data storage device 200. Such intelligent data duplication can be helpful, especially, for large files (e.g., video files) that may have the same content but not same or similar file names. The data duplication manager 210 may also analyze content of files and extract a topic or a context for the files to provide suggested file names. Such file names can be more descriptive and help the user easily understand the subject matter of the files. The data duplication manager 210 can also organize files that are related into one or more folders for ease of navigation/searching. Intelligent data duplication can enable users to duplicate data between different devices efficiently, in particular, when files are named and organized in different manners between the different devices.

FIGS. 4A-4D illustrate block diagrams for a workflow process for providing intelligent data duplication and associated user interfaces, according to certain embodiments.

Figure 4A:
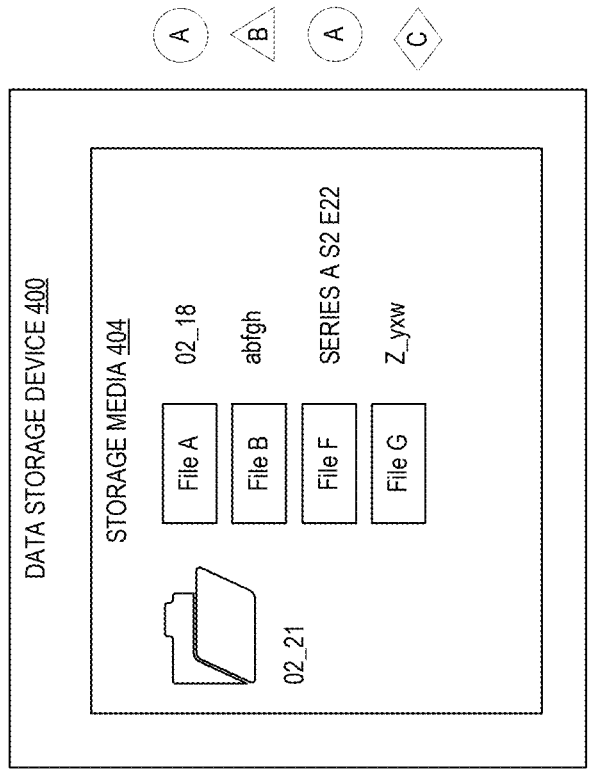
FIGS. 4A-4D illustrate block diagrams for a workflow process for providing intelligent data duplication and associated user interfaces, according to certain embodiments.
Figure 4A:
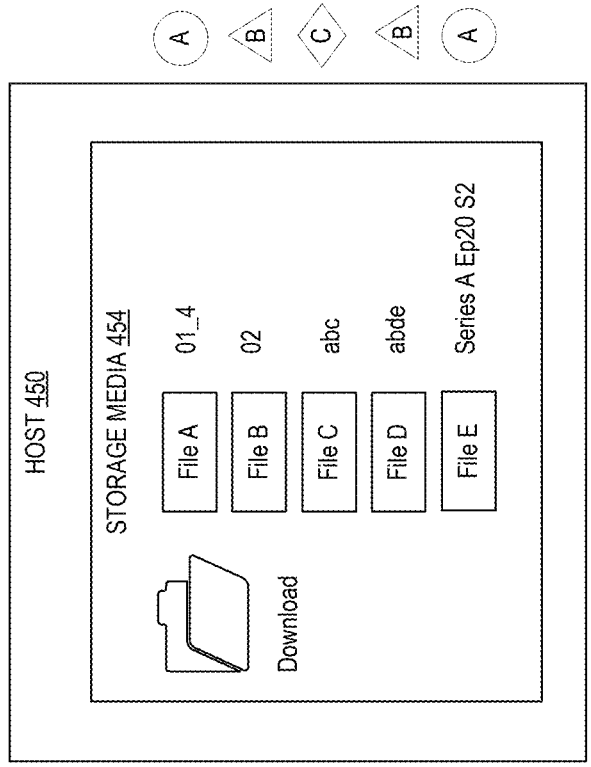

FIG. 4A illustrates a block diagram showing files on a host 450 and a data storage device 400 before performing data duplication. In the example of FIG. 4A, files stored on the host 450 and the data storage device 400 can be video files. For instance, intelligent data duplication can be helpful for comparing and duplicating large files. On the host 450, Files A, B, C, D, and E are stored on the storage media 454. Files A, B, C, D, and E are stored in a folder named "Download," and are named "01_4," "02," "abc," "abde," and "Series A Ep20 S2," respectively. Files A and E are associated with Series A; Files B and D are associated with Series B; and File C is associated with Series C. Logos for Series A, B, and C are shown in FIG. 4A to indicate which files are associated with which series. On the data storage device 400, Files A, B, F, and G are stored on the storage media 404. Files A, B, F, and G are stored in a folder named "02_21," and are named "02_18," "abfgh," "SERIES A S2 E22," and "Z_yxw," respectively. Files A and F are associated with Series A; File B is associated with Series B; and File G is associated with Series C.

Figure 4B:
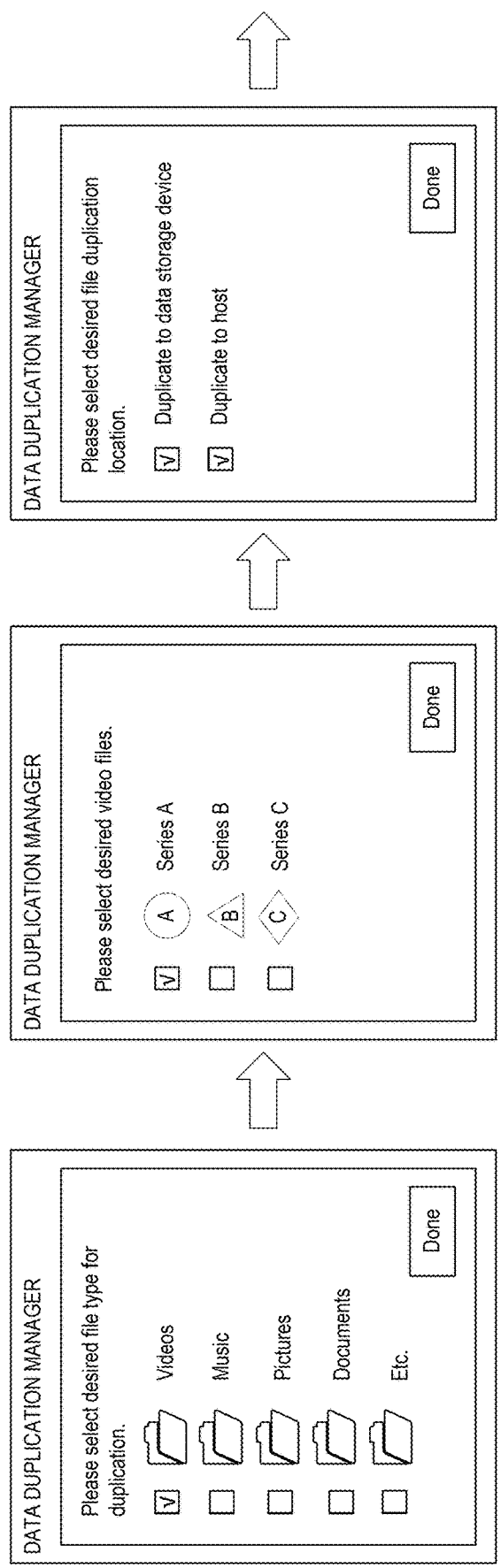
Figure 4C:
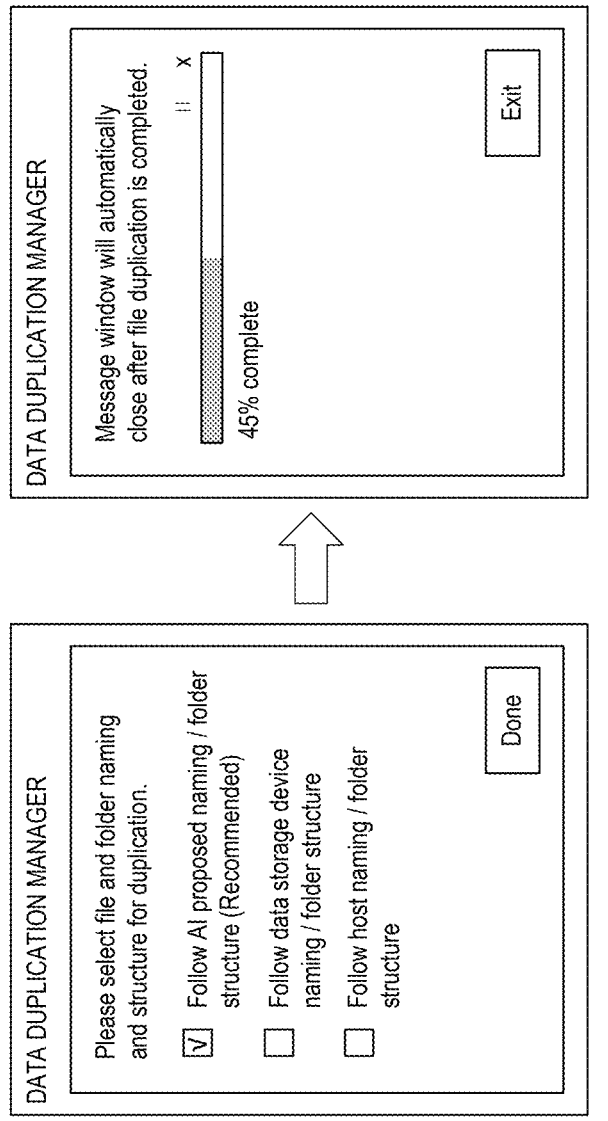

FIGS. 4B-4C illustrate block diagrams showing example user interfaces 440 associated with the intelligent data duplication process. When the intelligent data duplication process is initiated, a dialog box/window can be shown to the user on the host 450. A first user interface (UI) 440-1 asks the user to select category (ies) or type(s) of files of interest the user would like to duplicate. In the example of UI 440-1, the user is asked to select video files, music files, picture files, document files, etc. For example, the UI 440-1 can be shown after block 310 of the process 300 in FIG. 3. The data duplication process can be initiated after the user selects a category of files of interest for data duplication. As described in connection with FIG. 3, files in the user selected category of interest can be analyzed for data duplication. After candidate files for data duplication are identified, files having similar names can be grouped into folders to facilitate organization and navigation.

A second UI 440-2 asks the user to select one or more folders of identified files for duplication. In the example of UI 440-2, the user is asked to select one or more folders from Folders for Series A, B, and C, and the user selects the folder for Series A. For example, the UI 440-2 can be associated with block 340 of the process 300 in FIG. 3.

A third UI 440-3 asks the user to select devices or locations for data duplication. For example, data duplication can be performed for the data storage device or the host, or both the data storage device and the host. In the example of UI 440-3, the user selects to duplicate to both the data storage device and the host. For example, the UI 440-3 can be associated with block 345 of the process 300 in FIG. 3.

A fourth UI 440-4 asks the user to select which naming/structure to use for files to be duplicated. In the example of UI 440-4, the user is asked to select AI suggested file name/folder structure, host file name/folder structure, or the data storage device file name/folder structure. In the example of UI 440-4, the user selects AI suggested file name/folder structure. For example, the UI 440-4 can be associated with block 350 of the process 300 in FIG. 3.

A fifth UI 440-5 shows data duplication progress. For example, the UI 440-5 can be associated with block 355 of the process 300 in FIG. 3.

Figure 4D:
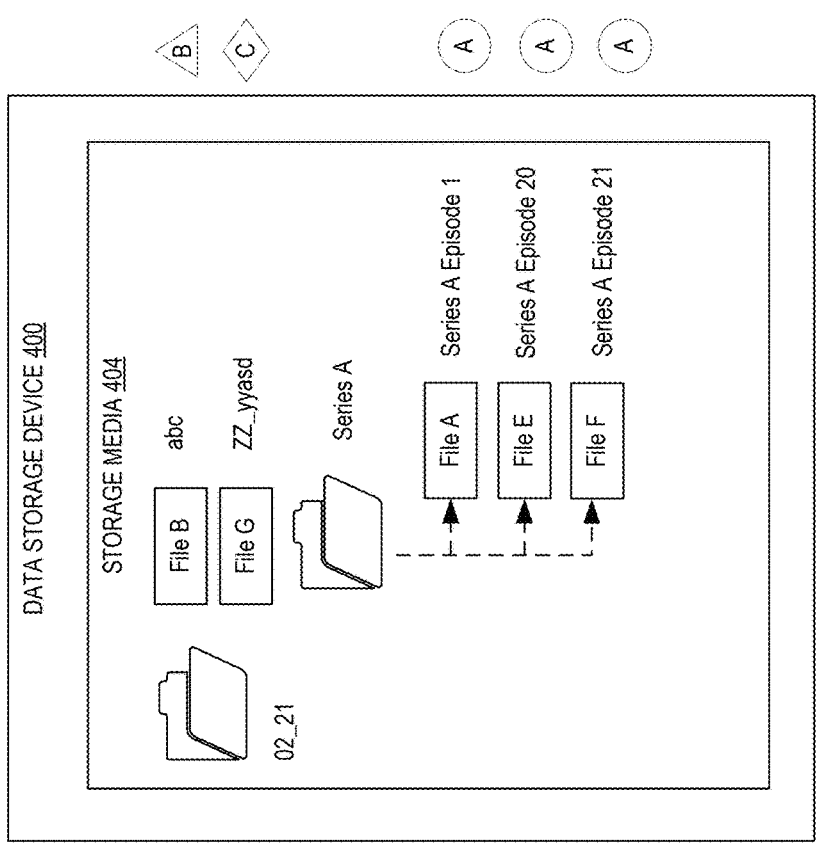
Figure 4D:
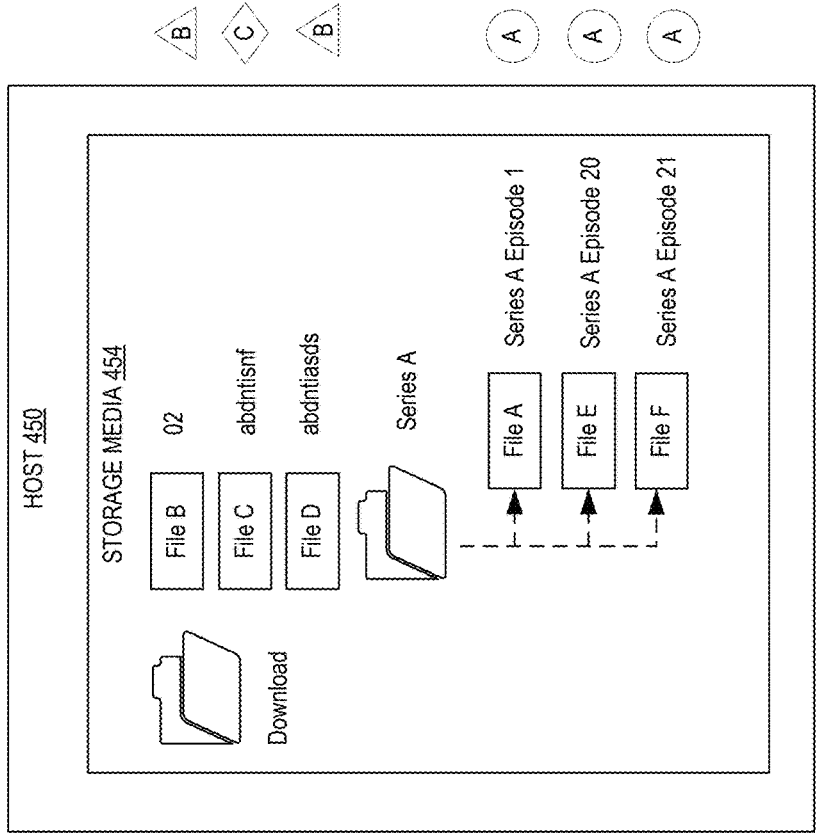

FIG. 4D illustrates a block diagram showing files on a host 450 and a data storage device 400 after performing data duplication. In the example of FIG. 4D, files are duplicated to both the host 450 and the data storage device 400. The user selected the folder for Series A to duplicate. Files A, E, and F are associated with Series A. Both the host 450 and the data storage device 400 included File A prior to duplication. File F is copied from the data storage device 400 to the host 450. File E is copied from the host 450 to the data storage device 400. On both the host 450 and the data storage device 400, Files A, E, and F are organized into a folder named "Series A," and Files A, E, and F are renamed using AI suggested file names as "Series A Episode 1," "Series A Episode 20," and "Series A Episode 21," respectively.

Figure 5:
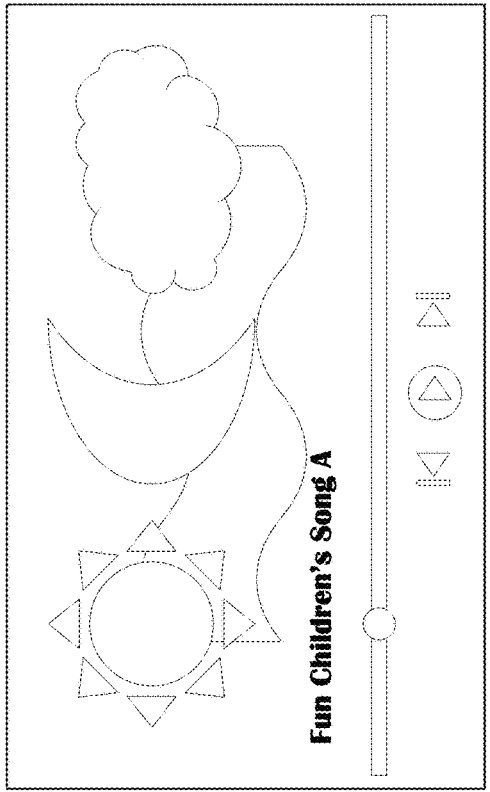
FIG. 5 illustrates a workflow process for providing suggested file names for intelligent data duplication in a data storage device, according to certain embodiments.
Figure 5:
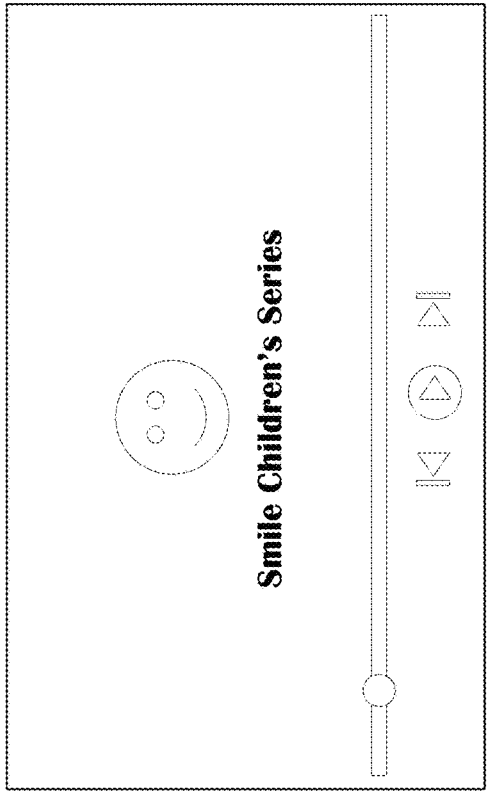
Figure 5:
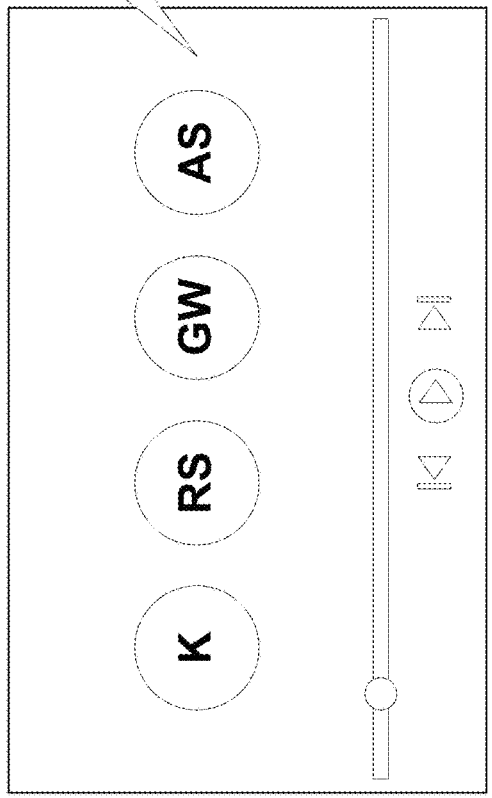

FIG. 5 illustrates a workflow process 500 for providing suggested file names for intelligent data duplication in a data storage device, in accordance with one or more embodiments.

At blocks 570-1 and 570-2, the workflow process 500 analyzes a video file to provide a suggested file name, for example, based on AI. For example, the process 500 can analyze an initial portion of a video file to determine a suggested file name. Information or context for the topic of a video file may be provided in an initial or earlier portion of the file such that a suggested file name may be determined without analyzing the entire file. For instance, the process 500 can analyze first 10-20% of the file to determine a context for the file. The portion or percentage of the file to analyze can be determined as appropriate. Only analyzing a portion of the file can make the process faster and also save resources. The video file can be analyzed based on image recognition or other suitable techniques. In the example of FIG. 5, the video file can be a children's song video for a children's series. For instance, the children's series may be called "Smile Children's Series," and the video may be about a song called "Fun Children's Song A." The process 500 can determine from the first 10% or 20% of the video file that the video relates to "Smile Children's Series," and is about a song called "Fun Children's Song A" and suggest the file name "Smile Children's Series-Fun Children's Song A."

At block 570-3, the workflow process 500 analyzes an audio file to provide a suggested file name, for example, based on AI. Similar to a video file, the process 500 can analyze an initial portion of an audio file to determine a suggested file name. Information or context for the topic of an audio file may be provided in an initial or earlier portion of the file such that a suggested file name may be determined without analyzing the entire file. For instance, the process 500 can analyze first 10-20% of the file to determine a context for the file. The portion or percentage of the file to analyze can be determined as appropriate. Only analyzing a portion of the file can make the process faster and also save resources. The audio file can be analyzed based on speech recognition, voice recognition, or other suitable techniques. In the example of FIG. 5, the audio file can be an audio recording of a meeting. In a meeting, the topic or agenda for the meeting is usually stated by an attendee at the beginning. Accordingly, the process 500 can determine that the topic for the meeting is "improving product design based on market survey in 2024" and provide a suggested file name based on the determined topic. The above examples are provided for illustrative purposes, and many variations are possible.

Figure 6:
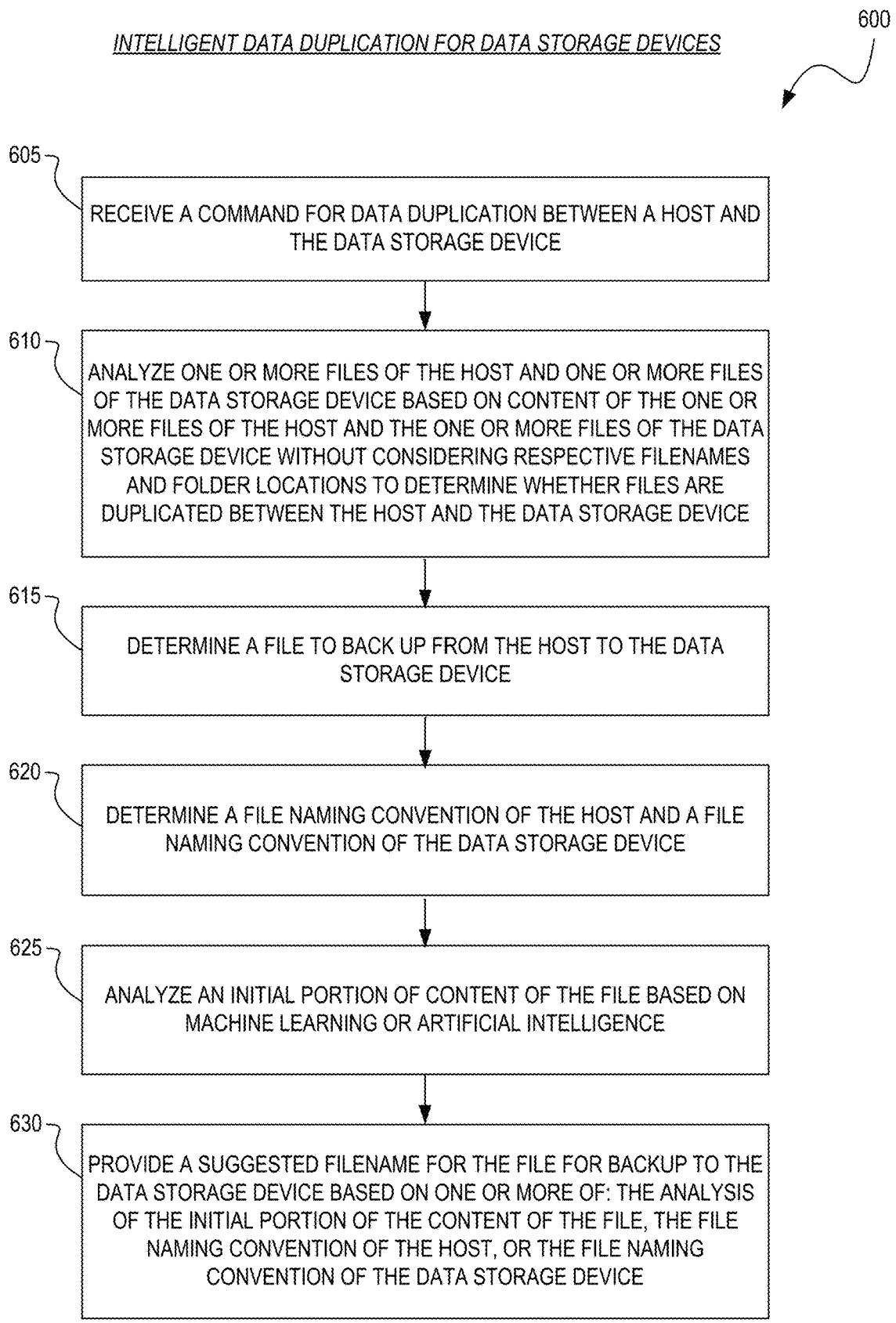
FIG. 6 illustrates a workflow process for providing intelligent data duplication in a data storage device, according to certain embodiments.

FIG. 6 illustrates a workflow process 600 for providing intelligent data duplication in a data storage device, according to one or more embodiments. The workflow process 600 may be implemented by a data storage device, such as a data storage device 100, 200 in FIGS. 1-2. For example, the workflow process 600 may be performed in part or in whole by a data storage device or one of its components, such as control circuitry, a processor, or a data duplication manager 110, 210. For illustrative purposes, the process 600 is explained below in connection with the data storage device 200 in FIG. 2. Certain details relating to the process 600 are explained in more detail with respect to FIGS. 1-5. Depending on the embodiment, the process 600 may include fewer or additional blocks, and the blocks may be performed in an order that is different from illustrated.

At block 605, the data storage device 200 can receive a command for data duplication between a host and the data storage device 200.

At block 610, the data storage device 200 can analyze one or more files of the host and one or more files of the data storage device 200 based on content of the one or more files of the host and the one or more files of the data storage device 200 without considering respective file names and folder locations to determine whether files are duplicated between the host and the data storage device 200. In some embodiments, the data storage device 200 can receive a user selection of a category of files for data duplication, and analyze the one or more files of the host and the one or more files of the data storage device 200 that are associated with the category. For example, the category of files is based on one or more of: a type of file or a file extension. In certain embodiments, the data storage device 200 can analyze the one or more files of the host and the one or more of the files of the data storage device 200 based on machine learning or artificial intelligence.

At block 615, the data storage device 200 can determine a file to back up from the host to the data storage device 200.

At block 620, the data storage device 200 can determine a file naming convention of the host and a file naming convention of the data storage device 200.

At block 625, the data storage device 200 can analyze an initial portion of content of the file based on machine learning or artificial intelligence.

At block 630, the data storage device 200 can provide a suggested file name for the file for backup to the data storage device 200 based on one or more of: the analysis of the initial portion of the content of the file, the file naming convention of the host, or the file naming convention of the data storage device 200. For example, the data storage device 200 can be further configured to provide the suggested file name for the file for backup to the data storage device based on the analysis of the initial portion of the content of the file. In some cases, the file is a video file and the data storage device 200 is further configured to analyze the initial portion of the content of the file based on image recognition to determine a topic or context for providing the suggested file name. In other embodiments, the file is an audio file and the data storage device 200 is further configured to analyze the initial portion of the content of the file based on speech recognition to determine a topic or context for providing the suggested file name. In certain embodiments, the data storage device 200 can determine a file and folder structure of the host and the data storage device 200, and provide the suggested file name based on one or more: of the file and folder structure of the host or the file and folder structure of the data storage device 200.

In some embodiments, the data storage device 200 can determine that the file matches a second file in a verified source, and provide a suggested file name for the file for backup to the data storage device based on a file name of the second file in the verified source. In certain embodiments, the data storage device 200 can determine that the file and one or more files from the analysis of the one or more files of the host and the one or more files of the data storage device 200 have a similarity in file name above a threshold level, and group the file and the one or more files having a similarity in file name above the threshold level in a folder.

In some embodiments, the data storage device 200 can receive a user selection of one or more folders each including files having a similarity in file name above a threshold level for data duplication.

The data storage device 200 can receive a user selection of a storage location for data duplication, wherein the storage location includes one or more of: the host, the data storage device, or both the host and the data storage device. The data storage device 200 may receive a user selection of a preferred file naming convention for data duplication, wherein the preferred file naming convention includes one or more of: a suggested file naming convention based on artificial intelligence, the file naming convention of the host, or the file naming convention of the data storage device 200.

Example Data Storage Device and Host System

Figure 7:
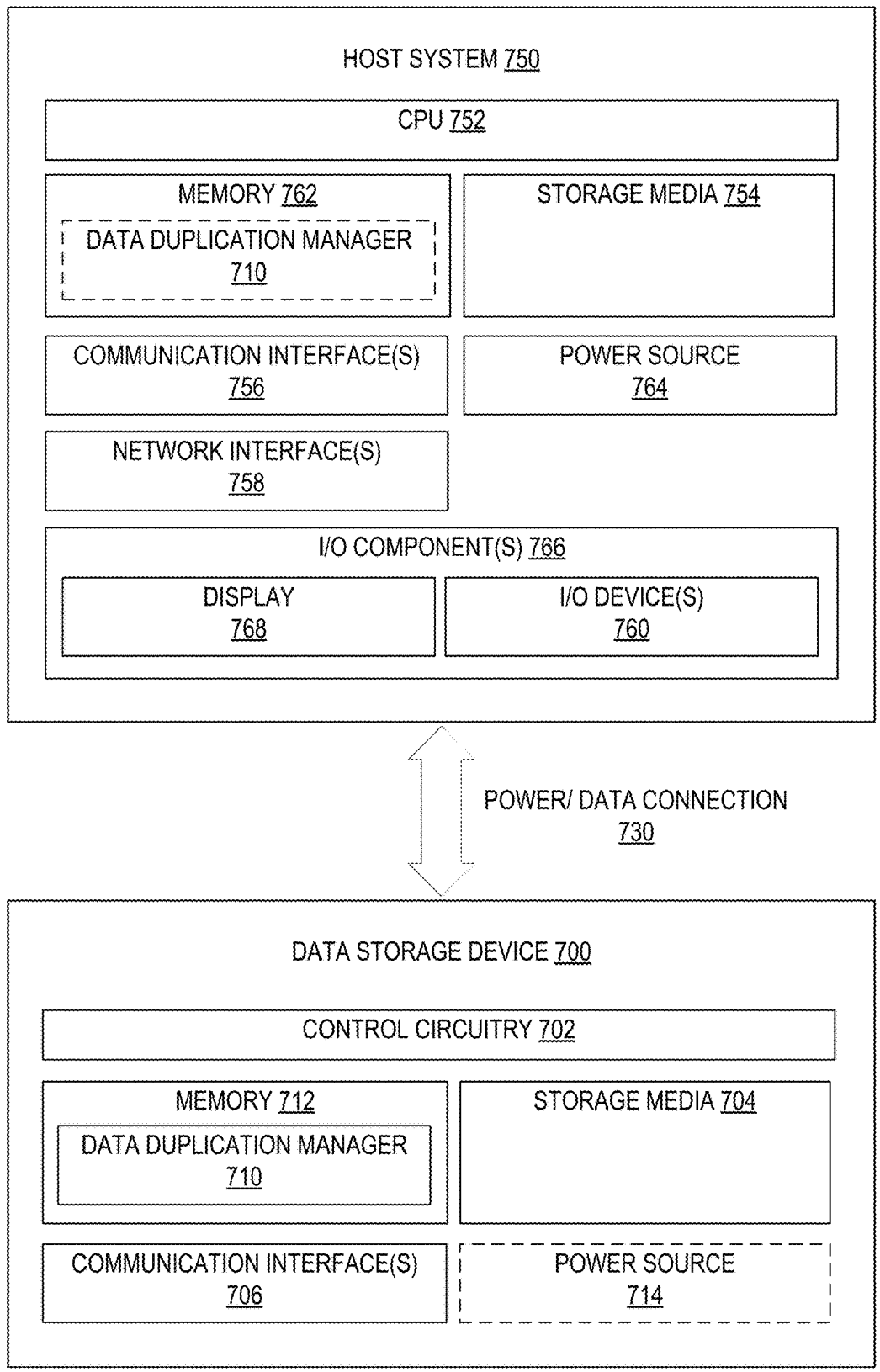
FIG. 7 illustrates a block diagram providing example details of a data storage device and a host system, according to certain embodiments.

FIG. 7 illustrates example details of a data storage device 700 and a host system 750, according to certain embodiments. As illustrated, the host system 750 can include one or more of the following components, devices, modules, and/or units (referred to herein as "components"), either separately/individually and/or in combination/collectively: one or more central processing units (CPUs) 752 or other type of processor, memory 762, one or more communication interfaces 756, one or more network interfaces 758, a power source 764 (e.g., battery or power supply unit), and/or one or more I/O components 766.

In some embodiments, the host system 750 can comprise a housing/enclosure configured and/or dimensioned to house or contain at least part of one or more of the components of the host system 750. In some embodiments, the storage media 754 may be housed internally in the enclosure of the host system 750. For example, the host system 750 may be a server or desktop system in case or rack mount enclosure with one or more storage drives in the case or enclosure. The host system 750 may be in a first enclosure, while the data storage device 700 may be external to the host system, being in a second enclosure different from the first enclosure.

The memory 762 can employ a variety of storage technologies and/or form factors and can include various types of volatile memory, such as Random Access Memory (RAM). RAM is a type of computer memory that serves as a temporary storage area for data and instructions that are actively being used by a computer's operating system, applications, and processes. RAM is volatile memory, meaning that its contents are lost when the computer is powered off or restarted. RAM provides fast and temporary access to data, enabling the CPU 752 to quickly retrieve and manipulate the information it needs to perform tasks.

The memory 762 can include programs that are running on the host system 750, such as a data duplication manager 710. The data duplication manager 710 can provide intelligent data duplication as described herein. The data duplication manager 710 may be implemented in different devices depending on the embodiment. For example, the data duplication manager 710 may be implemented in a host system, a data storage device, a network server, etc. The data duplication manager may be a program, driver, browser extension, or the like that runs on a processor of the host system 750.

In addition, the host system 750 may also include non-volatile memory or storage media 754 for permanently storing data, such as important files. The storage media 754 may be an internal storage drive, such as an SSD, SSHD, or HDD. A permanent copy of the data duplication manager 710 can be stored in the storage media 754 and then copied to memory 762 for running the program.

The one or more communication interfaces 756 can be a data interface that includes connectors, cables, and/or protocols for connection, communication, and/or power supply between host systems and the data storage device 700. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the data storage device 700, such as male or female Type A, Type B, Type C, mini, and/or micro connectors. Other data interface standards can also be used, such as external SATA (eSATA), ExpressCard, FireWire (IEEE 1364), and Thunderbolt. The data interface can include a port for connecting with a cable and/or a corresponding port on the data storage device 700, forming a power/data connection 730 with the data storage device 700.

The power source 764 can be configured to provide/manage power for the host system 750. The power source 764 can comprise one or more devices and/or circuitry configured to provide a source of power and/or provide power management functionality. Moreover, in some embodiments the power source 764 includes a mains power connector that is configured to couple to an alternating current (AC) or direct current (DC) mains power source. In some embodiments, the power source can include one or more batteries, such as a lithium-based battery, a lead-acid battery, an alkaline battery, and/or another type of battery.

The one or more I/O components 766 can include a variety of components to receive input and/or provide output. The one or more I/O components 766 can be configured to receive touch, speech, gesture, biometric data, or any other type of input. For example, the one or more I/O components 766 can be used to provide input regarding control of the host system 750, such as opening files, entering logins, plays, and/or changing settings. As shown, the one or more I/O components 766 can include a display 768 configured to display data and various user interfaces. The display 768 can include one or more liquid-crystal displays (LCD), light-emitting diode (LED) displays, organic LED displays, plasma displays, electronic paper displays, and/or any other type(s) of technology. In some embodiments, the display 768 can include one or more touchscreens configured to receive input and/or display data. Further, the one or more I/O components 766 can include the one or more input/output devices 760, which can include a touchscreen, touch pad, controller, mouse, keyboard, wearable device (e.g., optical head-mounted display), virtual or augmented reality device (e.g., head-mounted display), etc.

As illustrated, the data storage device 700 can include one or more of the following components, devices, modules, and/or units (referred to herein as "components"), either separately/individually and/or in combination/collectively: control circuitry 702, storage media 704, communication interfaces 706, memory 712, and/or optionally a power source 714 (e.g., battery or power supply unit). In some embodiments, the data storage device 700 can comprise a housing/enclosure configured and/or dimensioned to house or contain the components of the data storage device 700. In some examples, the data storage device 700 does not have its own power source but receives power only from the host system 750 via the power/data connection 730.

The data storage device 700 may be an external storage drive, SD card, flash drive, or a USB memory stick that uses semiconductor memory as the storage media. For example, the data storage device 700 may be an external drive that is connected to the host system 750 via an external port, such as USB. In other examples, the data storage device 700 may be an SD card, a microSD card, or another type of flash card that is readable from a memory reader of the host system 750. In other implementations, the data storage device 700 may be an external storage drive that uses an HDD that uses magnetic disks as the storage media, an SSHD that uses a combination of semiconductor memory and magnetic disk technology, or a tape drive that uses tape media.

Although certain components of the data storage device 700 and host system 750 are illustrated in FIG. 7, it should be understood that additional components not shown can be included in embodiments in accordance with the present disclosure. Furthermore, certain of the illustrated components can be omitted in some embodiments. Although the control circuitry 702 is illustrated as a separate component, it should be understood that any or all of the remaining components of the data storage device 700 can be embodied at least in part in the control circuitry 702. That is, the control circuitry 702 can include various devices (active and/or passive), semiconductor materials and/or areas, layers, regions, and/or portions thereof, conductors, leads, vias, connections, and/or the like, wherein one or more of the other components of the data storage device 700 and/or portion(s) thereof can be formed and/or embodied at least in part in/by such circuitry components/devices.

The various components of the data storage device 700 can be electrically and/or communicatively coupled using certain connectivity circuitry/devices/features, which can or may not be part of the control circuitry 702. For example, the connectivity feature(s) can include one or more printed circuit boards configured to facilitate mounting and/or interconnectivity of at least some of the various components/circuitry of the data storage device 700. In some embodiments, two or more of the control circuitry 702, the storage media 704, the communication interface(s) 706, the memory 712, and/or the power source 714, can be electrically and/or communicatively coupled to each other.

The control circuitry 702 can include hardware and/or software (e.g., firmware) for performing intelligent data duplication, such as a data duplication manager 710. The data duplication manager 710 may be implemented in firmware, which may be run on a controller chip. In some implementations, the data duplication manager 710 may be a specialized, hardware-based chip for performing intelligent data duplication. The data duplication manager 710 may be implemented as one or more components or one or more modules.

The storage media 704 can utilize various types of non-volatile memory (NVM) to permanently store data. NVM is a type of computer memory that can retain stored information even after power is removed. For example, the storage media 704 can include one or more magnetic disks and/or semiconductor memory. The semiconductor memory can include any of various memory technologies, such as NAND memory and its variations like SLC, eMLC (Enterprise Multi Level Cell), MLC, TLC, and QLC. New types of emerging non-volatile memory could also be used such as Program in Place or Storage Class Memory (SCM) such as ReRam, Phase-Change Memory (PCM), and Magnetoresistive Random-Access Memory (MRAM).

The one or more communication interfaces 706 can be configured to communicate with one or more device/sensors/systems. For example, the one or more communication interfaces 706 can send/receive data over a network. A network in accordance with embodiments of the present disclosure can include a local area network (LAN), wide area network (WAN) (e.g., the Internet), personal area network (PAN), body area network (BAN), etc.

The one or more communication interfaces 706 can be a data interface that includes connectors, cables, and/or protocols for connection, communication, and/or power supply between the host system 750 and the data storage device 700. In some embodiments, a port of the data interface can enable transfer of both data and power to connected devices. In some embodiments, the data interface comprises USB hardware and/or software. Various versions of USB can be used, such as USB 2.x, USB 3.x, or USB 4.x. The data interface can include a physical port for coupling with connectors and cables. Various types of USB ports can be included on the data storage device 700, such as male or female Type A, Type B, Type C, mini, and/or micro connectors. Other data interface standards can also be used, such as external SATA (eSATA), ExpressCard, FireWire (IEEE 1364), and Thunderbolt. The data interface can include a port for connecting with a cable and/or a corresponding port on the host system 750, forming the power/data connection 730.

The optional power source 714 can be configured to provide/manage power for the data storage device 700. In some embodiments, the power source can include one or more batteries, such as a lithium-based battery, a lead-acid battery, an alkaline battery, and/or another type of battery. In some embodiments the power source 714 includes a mains power connector that is configured to couple to an alternating current (AC) or direct current (DC) mains power source. However, in some embodiments, the data storage device 700 may not include an internal power source but be configured to receive power through the communication interface 706, such as via a USB connection.

The term "control circuitry" is used herein according to its broad and ordinary meaning, and can refer to any collection of one or more processors, processing circuitry, processing modules/units, chips, dies (e.g., semiconductor dies including one or more active and/or passive devices and/or connectivity circuitry), microprocessors, micro-controllers, digital signal processors, microcomputers, central processing units, graphics processing units, field programmable gate arrays, programmable logic devices, state machines (e.g., hardware state machines), logic circuitry, analog circuitry, digital circuitry, and/or any device that manipulates signals (analog and/or digital) based on hard coding of the circuitry and/or operational instructions. They may be configured to work individually or in combination. Control circuitry can further comprise one or more data storage devices, which can be embodied in a single memory device, a plurality of memory devices, and/or embedded circuitry of a device. Such data storage can comprise read-only memory, random access memory, volatile memory, non-volatile memory, static memory, dynamic memory, flash memory, cache memory, data storage registers, and/or any device that stores digital information. It should be noted that in embodiments in which control circuitry comprises a hardware state machine (and/or implements a software state machine), analog circuitry, digital circuitry, and/or logic circuitry, data storage device(s)/register(s) storing any associated operational instructions can be embedded within, or external to, the circuitry comprising the state machine, analog circuitry, digital circuitry, and/or logic circuitry.

The term "memory" is used herein according to its broad and ordinary meaning and can refer to any suitable or desirable type of computer-readable media. For example, computer-readable media can include one or more volatile data storage devices, non-volatile data storage devices, removable data storage devices, and/or nonremovable data storage devices implemented using any technology, layout, and/or data structure(s)/protocol, including any suitable or desirable computer-readable instructions, data structures, program modules, or other types of data.

Computer-readable media that can be implemented in accordance with embodiments of the present disclosure includes, but is not limited to, phase change memory, static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic data storage devices, or any other non-transitory medium that can be used to store information for access by a computing device. As used in certain contexts herein, computer-readable media may not generally include communication media, such as modulated data signals and carrier waves. As such, computer-readable media should generally be understood to refer to non-transitory media.

ADDITIONAL EMBODIMENTS

Those skilled in the art will appreciate that in some embodiments, other types of data storage devices can be implemented while remaining within the scope of the present disclosure. In addition, the actual steps taken in the processes discussed herein may differ from those described or shown in the figures. Depending on the embodiment, certain of the steps described above may be removed, others may be added, and the order may be rearranged.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer data storage device or collection of data storage devices. Some or all of the methods may alternatively be embodied in specialized computer hardware.

What is claimed is:

1. A data storage device comprising:
a non-volatile memory; and
control circuitry configured to:
receive a command for data duplication between a host and the data storage device;
analyze one or more files of the host and one or more files of the data storage device based on content of the one or more files of the host and the one or more files of the data storage device without considering respective file names and folder locations to determine whether files are duplicated between the host and the data storage device;
determine a file to back up from the host to the data storage device;
determine a file naming convention of the host and a file naming convention of the data storage device;
analyze an initial portion of content of the file based on machine learning or artificial intelligence; and
provide a suggested file name for the file for backup to the data storage device based on one or more of: the analysis of the initial portion of the content of the file, the file naming convention of the host, or the file naming convention of the data storage device.

2. The data storage device of claim 1, wherein the control circuitry is further configured to provide the suggested file name for the file for backup to the data storage device based on the analysis of the initial portion of the content of the file.

3. The data storage device of claim 2, wherein the file is a video file and the control circuitry is further configured to analyze the initial portion of the content of the file based on image recognition to determine a topic or context for providing the suggested file name.

4. The data storage device of claim 2, wherein the file is an audio file and the control circuitry is further configured to analyze the initial portion of the content of the file based on speech recognition to determine a topic or context for providing the suggested file name.

5. The data storage device of claim 1, wherein the control circuitry is further configured to:
receive a user selection of a category of files for data duplication; and
analyze the one or more files of the host and the one or more files of the data storage device that are associated with the category.

6. The data storage device of claim 5, wherein the category of files is based on one or more of: a type of file or a file extension.

7. The data storage device of claim 1, wherein the control circuitry is further configured to analyze the one or more files of the host and the one or more of the files of the data storage device based on machine learning or artificial intelligence.

8. The data storage device of claim 1, wherein the control circuitry is further configured to:
determine that the file matches a second file in a verified source; and
provide a suggested file name for the file for backup to the data storage device based on a file name of the second file in the verified source.

9. The data storage device of claim 1, wherein the control circuitry is further configured to:
determine that the file and one or more files from the analysis of the one or more files of the host and the one or more files of the data storage device have a similarity in file name above a threshold level; and
group the file and the one or more files having a similarity in file name above the threshold level in a folder.

10. The data storage device of claim 1, wherein the control circuitry is further configured to:
receive a user selection of a storage location for data duplication, wherein the storage location includes one or more of: the host, the data storage device, or both the host and the data storage device.

11. The data storage device of claim 1, wherein the control circuitry is further configured to:
receive a user selection of a preferred file naming convention for data duplication, wherein the preferred file naming convention includes one or more of: a suggested file naming convention based on artificial intelligence, the file naming convention of the host, or the file naming convention of the data storage device.

12. The data storage device of claim 1, wherein the control circuitry is further configured to:
determine a file and folder structure of the host and the data storage device; and
provide the suggested file name based on one or more: of the file and folder structure of the host or the file and folder structure of the data storage device.

13. A method of performing data duplication in a data storage device, the method comprising:
receiving, by control circuitry, a command for data duplication between a host and a data storage device;
analyzing, by the control circuitry, one or more files of the host and one or more files of the data storage device based on content of the one or more files of the host and the one or more files of the data storage device without considering respective file names and folder locations to determine whether files are duplicated between the host and the data storage device;
determining, by the control circuitry, a file to back up from the host to the data storage device;
determining, by the control circuitry, a file naming convention of the host and a file naming convention of the data storage device;
analyzing, by the control circuitry, an initial portion of content of the file based on machine learning or artificial intelligence; and
providing, by the control circuitry, a suggested file name for the file for backup to the data storage device based on one or more of: the analysis of the initial portion of the content of the file, the file naming convention of the host, or the file naming convention of the data storage device.

14. The method of claim 13, wherein the providing the suggested file name for the file for backup to the data storage device is based on the analysis of the initial portion of the content of the file.

15. The method of claim 14, wherein the file is a video file and the analyzing the initial portion of the content of the file is based on image recognition to determine a topic or context for providing the suggested file name.

16. The method of claim 14, wherein the file is an audio file and the analyzing the initial portion of the content of the file is based on speech recognition to determine a topic or context for providing the suggested file name.

17. The method of claim 13, wherein the analyzing the one or more files of the host and the one or more files of the data storage device is based on machine learning or artificial intelligence.

18. The method of claim 13, further comprising:
receiving a user selection of a storage location for data duplication, wherein the storage location includes one or more of: the host, the data storage device, or both the host and the data storage device.

19. The method of claim 13, further comprising:
receiving a user selection of a preferred file naming convention for data duplication, wherein the preferred file naming convention includes one or more of: a suggested file naming convention based on artificial intelligence, the file naming convention of the host, or the file naming convention of the data storage device.

20. A data storage device comprising:
a non-volatile memory; and
controller means configured to:
receive a command for data duplication between a host and the data storage device;
analyze one or more files of the host and one or more files of the data storage device based on content of the one or more files of the host and the one or more files of the data storage device without considering respective file names and folder locations to determine whether files are duplicated between the host and the data storage device;
determine a file to back up from the host to the data storage device;
determine a file naming convention of the host and a file naming convention of the data storage device;
analyze an initial portion of content of the file based on machine learning or artificial intelligence; and
provide a suggested file name for the file for backup to the data storage device based on one or more of: the analysis of the initial portion of the content of the file, the file naming convention of the host, or the file naming convention of the data storage device.

* * * * *